(12) United States Patent
Ubelhart et al.

(10) Patent No.: US 10,760,659 B2
(45) Date of Patent: Sep. 1, 2020

(54) EXTERNAL COOLING OF A TORQUE CONVERTER COVER

(71) Applicant: SCHAEFFLER TECHNOLOGIES AG & CO. KG, Herzogenaurach (DE)

(72) Inventors: Eric Ubelhart, Orrville, OH (US); Peter Rentfrow, Smithville, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 59 days.

(21) Appl. No.: 16/114,922

(22) Filed: Aug. 28, 2018

(65) Prior Publication Data
US 2020/0072331 A1 Mar. 5, 2020

(51) Int. Cl.
| | | |
|---|---|---|
| F16H 41/30 | (2006.01) | |
| F16H 61/14 | (2006.01) | |
| F16H 45/02 | (2006.01) | |
| F16H 59/72 | (2006.01) | |

(52) U.S. Cl.
CPC ............ *F16H 41/30* (2013.01); *F16H 45/02* (2013.01); *F16H 61/143* (2013.01); *F16H 59/72* (2013.01)

(58) Field of Classification Search
CPC ...................................................... F16H 41/30
See application file for complete search history.

(56) References Cited

U.S. PATENT DOCUMENTS

| | | | |
|---|---|---|---|
| 2,680,954 A | * | 6/1954 | Churchill ................ F16H 41/30 60/337 |
| 2,699,642 A | * | 1/1955 | Ahlen ..................... F16H 41/30 165/51 |
| 2,861,480 A | | 11/1958 | Curtis |
| 6,394,243 B1 | | 5/2002 | Sasse |
| 7,445,099 B2 | | 11/2008 | Maucher et al. |
| 9,917,482 B2 | | 3/2018 | Lindemann et al. |
| 9,970,523 B2 | | 5/2018 | Ross et al. |
| 2008/0277227 A1 | | 11/2008 | Jameson et al. |
| 2012/0222640 A1 | * | 9/2012 | Bruns ..................... F02M 21/02 123/1 A |
| 2013/0056319 A1 | | 3/2013 | Lindemann et al. |
| 2013/0230385 A1 | | 9/2013 | Lindemann et al. |
| 2016/0105060 A1 | * | 4/2016 | Lindemann ............ H02K 7/006 701/22 |
| 2018/0031098 A1 | | 2/2018 | Adari |

FOREIGN PATENT DOCUMENTS

GB 805073 A * 11/1958 ............ F16H 41/30

* cited by examiner

*Primary Examiner* — Timothy Hannon
(74) *Attorney, Agent, or Firm* — Brooks Kushman P.C.

(57) ABSTRACT

A transmission comprising a motor, a torque converter cover including an outside surface and an inside surface, a clutch configured to contact a portion of the inside surface of the torque converter cover, and a sprayer including a first end and a second end and configured to emit fluid on an outside surface of the torque converter is disclosed.

20 Claims, 4 Drawing Sheets

EXTERNAL COOLING OF A TORQUE CONVERTER COVER

TECHNICAL FIELD

The present disclosure relates to an apparatus and method for cooling a torque converter.

BACKGROUND

Torque converter clutch cooling may be provided through a flow across clutch paper and conduction through metal turbine and impeller materials due to the torque converter being required to be in a dry environment. This may be a limiting factor for heat extraction from a clutch under high energy conditions or higher slip conditions.

SUMMARY

According to one embodiment, a pump in a transmission of a vehicle comprising a top portion configured to mount onto a housing of the transmission, an outlet, an inlet in fluid communication with a sump that includes fluid, and a hose that includes a first end and a second end, wherein the first end is connected to the outlet and the second end includes a sprayer configured to emit fluid onto a torque converter cover.

According to one embodiment, an apparatus for a torque converter comprises a hose mounted on a housing of a transmission, wherein the hose includes a sprayer configured to spray fluid received from a supply in fluid communication with the hose, wherein the sprayer is further configured to spray onto an outside surface of a cover of the torque converter.

According to one embodiment, a transmission comprises a motor, a torque converter cover including an outside surface and an inside surface, a clutch configured to contact a portion of the inside surface of the torque converter cover, and a sprayer including a first end and a second end and configured to emit fluid on an outside surface of the torque converter.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Traditionally, grooves in a clutch may be used to reduce heat in a torque converter. It may be beneficial to provide additional cooling to a torque converter clutch through a jet/spray cooling application outside of the torque converter. For example, in a P2 hybrid such as a module hybrid transmission (MHT), the torque converter may be in a wet environment already. The additional cooling capability could provide improved clutch capacity or clutch life based on lower surface temperatures of a clutch contact surface. There may also be higher loading/energy capabilities for current clutch designs. This may work with both an integrated torque converter (iTC) or traditional torque converter clutch locations. For example, an iTC includes an integrated turbine and piston of the torque converter, wherein the turbine forms a lock-up clutch of arranged to lock together the impeller and turbine in a torsionally fixed manner. Torque converter turbines incorporating lock-up clutches are known and one example is shown in commonly-assigned U.S. Pat. No. 7,445,099 (or US Patent Application 2013/0230385 and U.S. Pat. No. 9,995,381), herein incorporated by reference.

Figure 1:
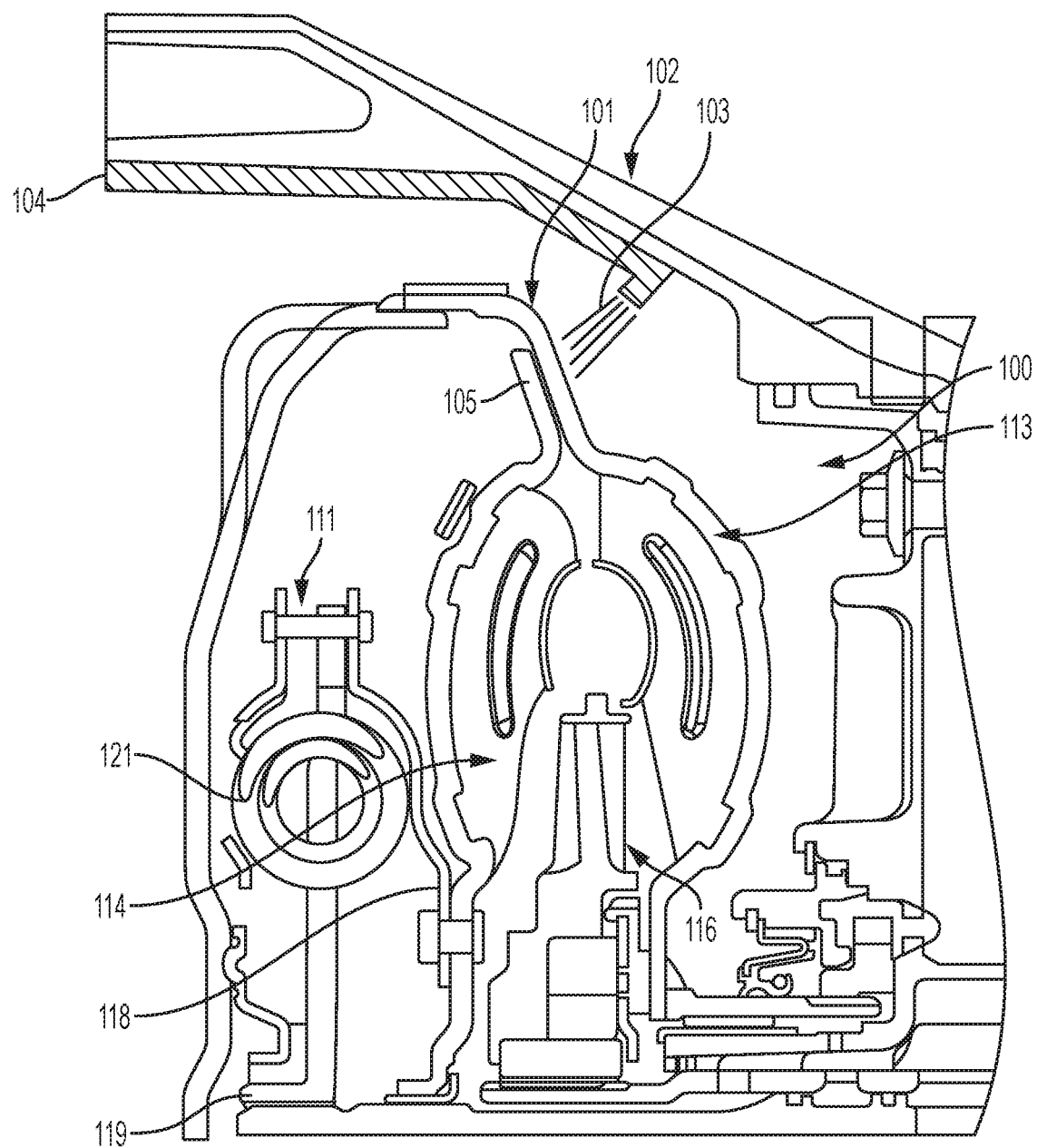
FIG. 1 is a cross-sectional view of an integrated torque converter with an external cooling from the engine side.

FIG. 1 is a cross-sectional view of an integrated torque converter with an external cooling from the engine side. A torque converter 100 includes a cover, impeller 113, turbine 114, and stator 116. A hub may be non-rotatably connected to a cover of the torque converter, for example, by at least one rivet. In an example embodiment, torque converter 100 includes torsional vibration damper 111 with input part 118 non-rotatably connected to turbine 114, output part 119 arranged to connect to a transmission input shaft and at least one spring 121 engaged with input part 118 and output part 119. A supply 104 is radially outward from a torsional vibration damper 111 and may be considered an engine-side supply, as shown in FIG. 1.

The modular hybrid transmission may include a separate reservoir for a different type of oil to cool the torque converter cover 101. In this embodiment, the reservoir or supply may be located on an engine side of the torque converter 100. The reservoir or supply 104 may also include a pump that is connected to a hose that may spray a torque converter cover 101. While in one embodiment, a pump may be used that has a control unit to monitor when to spray the torque converter. In another embodiment, a valve (e.g. a poppet valve) may be utilized to spray the torque converter when a threshold pressure is exceeded. The spray 103 may be filled with automatic transmission fluid (e.g. ATF cooling) or a different type of oil/lubricant than that used to cool the transmission. A hose may be mounted on a housing 102 of the module hybrid transmission. The hose may be a separate tubing or channel that is connected to a reservoir of fluid 104 to cool the transmission. At one end of the hose may be orifices or perforations that control a flow-rate as to which fluid may be sprayed onto the torque converter cover 101.

As shown in FIG. 1, the spray 103 may be in contact with the torque converter cover 101. Ideally, the spray 103 should be in contact with an outside surface of the torque converter cover 101 that is located adjacent to the inside surface of the cover 101 that comes in contact with the clutch 105 of the torque converter 100. Thus, the clutch 105 of the torque converter 100 may generate heat that is transferred to the torque converter cover 101. Thus, the spray 103 may be utilized too cool the heat generated by the clutch 105 making contact with the torque converter cover 101. In other embodiments, the spray 103 may emit fluid onto any surface of the torque converter cover 101 and is not limited to the surface opposite of the contact area of the torque converter clutch 105. It should also be recognized that the spray 103 may be angled at any degree to emit fluid onto any portion of the torque converter 100. Additionally, the rate at which the spray 103 may emit fluid to cool the torque converter 100 may also be adjusted based on cooling requirements. The spray rate may be controlled by the transmission (e.g. pressure within the transmission), as well as by an electronic control unit (ECU). In one embodiment, the transmission may dictate a threshold pressure to emit the spray 103 at specified flow rate. In another embodiment, an ECU in communication with the pump may control the pressure to emit the spray 103 at a specified flow rate.

Figure 2:
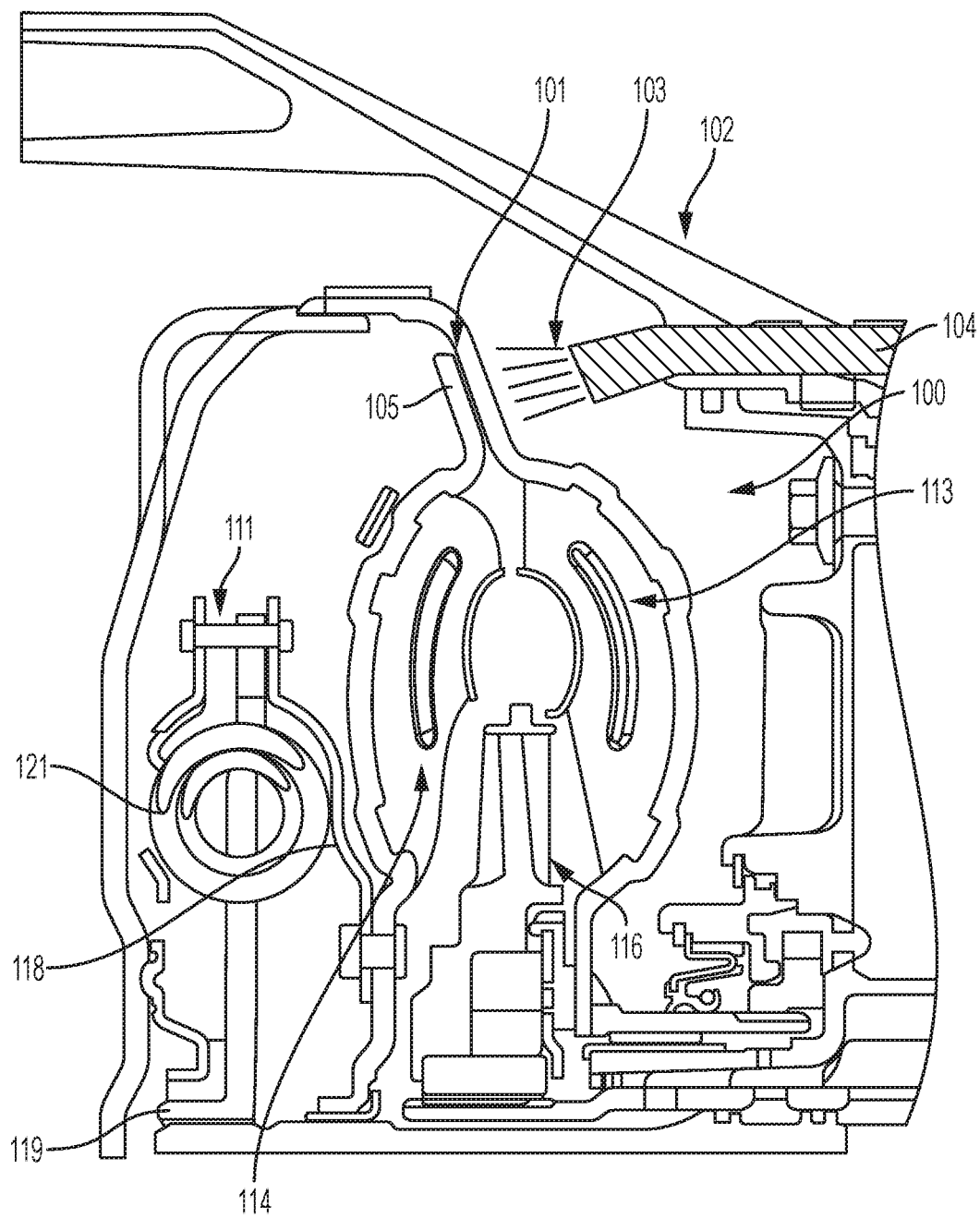
FIG. 2 is a cross-sectional view of an integrated torque converter with an external cooling from the transmission side.

FIG. 2 is a cross-sectional view of an integrated torque converter with an external cooling from the transmission side. While the embodiment in FIG. 2 may appear to be similar to that of FIG. 1 shown above, a key distinction is that the cooling supply 104 is located on the transmission side of the torque converter 100. Given that the supply 104 may come from the transmission side, the reservoir may be fluid (e.g. oil) located in the transmission sump. In another embodiment, while the supply 104 may come from the transmission side, the fluid may be a pump or a sump that is located on the engine side. Packaging requirements may alter the location of where the supply 104 is mounted and the location of where a pump or sump is located.

Figure 3:
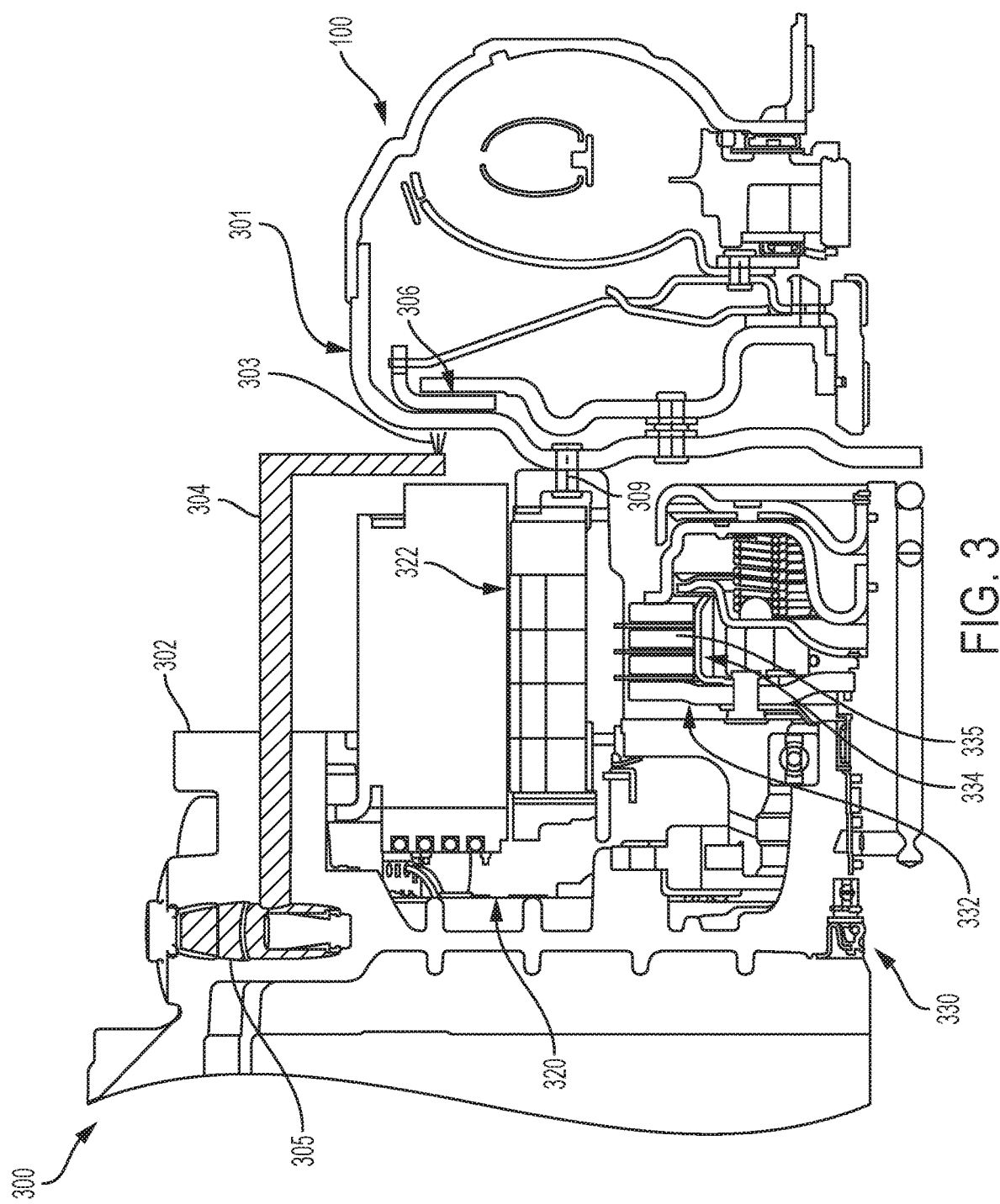
FIG. 3 is a cross-sectional view of a non-integrated torque converter with an external cooling from the engine side.

FIG. 3 is a cross-sectional view of a non-integrated torque converter with an external cooling supplied from the engine side. The torque converter 100 of FIG. 3 may include a motor 320 that is part of a modular hybrid transmission module 300. The motor 320 may include a rotor 322, as well as a stator. In an example embodiment, module 300 includes or, is arranged to engage, with an input part and includes a disconnect clutch. The module 300 is arranged to receive torque, for example, from an internal combustion engine (not shown). Clutch 332 includes at least one clutch plate non-rotatably connected to a hub, inner carrier 334 non-rotatably connected to an input part, clutch plate 335 non-rotatably connected to inner carrier 334, and a piston plate axially displaceable to open and close clutch 332. Clutch 332 enables selective connection of an input part 330 and cover 301. Thus, module 300 can function in at least three modes. For a first mode, clutch 332 is open and electric motor 320, via rotor 322, is the only source of torque for torque converter 100. For a second mode, clutch 332 is closed, electric motor 320 is not driving torque converter 100, and the only source of torque for torque converter 100 is input part 330 via a disconnect clutch. For a third mode, clutch 332 is closed and motor 320 is used to provide torque to input part 330 to start an internal combustion engine (not shown) attached to input part 330.

The modular hybrid transmission module 300 may include a control valve (e.g. poppet valve or other valve)/pump 305 that is mounted to a housing 302. The control valve 305 may include a sump or reservoir that is filled with fluid that may be utilized to cool a torque converter cover 301. The supply 304 may have a first end that is in contact with the control valve 305 or a sump/reservoir. A second end of the supply 304 may be located adjacent a torque converter cover 301. At the second end of the supply 304 may be orifices or perforations that dictate the flow rate of the spray 303.

As shown in FIG. 3, the spray 303 may be in contact with the torque converter cover 301. The spray 303 may be in contact with an outside surface of the torque converter cover 301 that is located adjacent to the inside surface of the cover 301 that comes in contact with the clutch 306 of the torque converter 100. However, the spray 303 may emit fluid anywhere on the torque converter cover 301. It should also be recognized that the spray 303 may be angled to hit any portion of the torque converter 100. Additionally, the rate at which the spray 303 may emit fluid to cool the torque converter may also be adjusted based on cooling requirements. The spray rate may be controlled by the transmission (e.g. pressure within the transmission), as well as by an electronic control unit (ECU). In one embodiment, the transmission dictates a threshold pressure to emit the spray 303, which may be emitted at specified flow rate. In another embodiment, an ECU in communication with the pump may control the pressure to emit the spray 103 at a specified flow rate.

Figure 4:
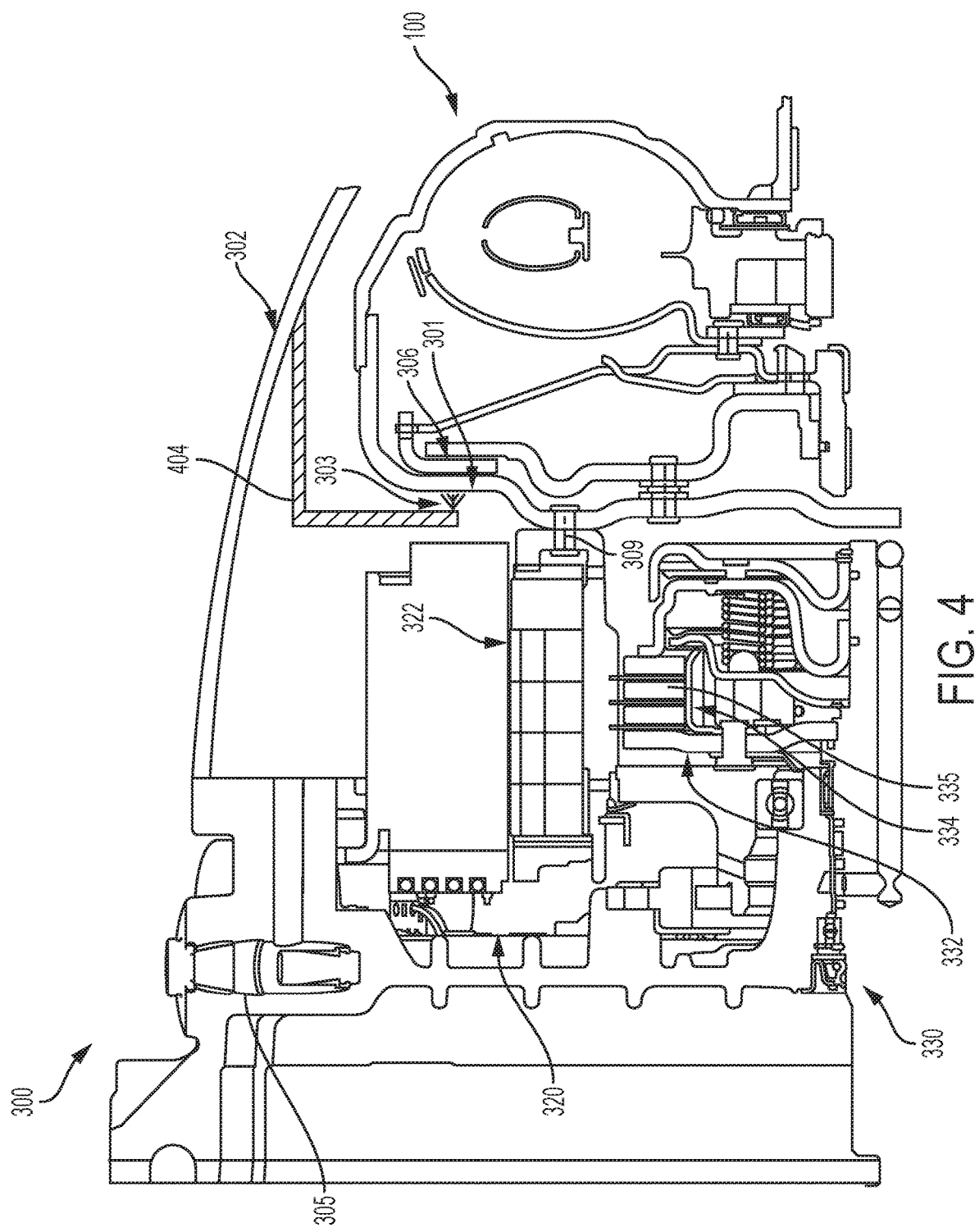
FIG. 4 is a cross-sectional view of a non-integrated torque converter with an external cooling from the transmission side.

FIG. 4 is a cross-sectional view of a non-integrated torque converter with an external cooling supplied from the transmission side. Due to packaging requirements of the transmission, it may be beneficial to have a transmission-side supply 404. As shown in FIG. 4, while the transmission-side supply 404 may be a hose that originates from the transmission, the control valve 305 may be located closer to the engine-side of the transmission 300. In an alternative embodiment, the transmission-side supply 404 may be connected to a control valve 305 that is located closer to the transmission-side.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST 100 torque converter
101 torque converter cover
102 housing
103 spray
104 supply 105 clutch
111 torsional vibration damper
113 impeller
114 turbine
116 stator
118 input part
119 output part
121 spring
300 modular hybrid transmission
301 torque converter cover
302 housing
303 spray
304 supply
305 control valve
306 torque converter clutch
309 rivet
320 Motor
322 Rotor
330 input part
332 clutch
334 inner carrier
335 clutch plate
404 transmission-side supply The above is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

What is claimed is:

1. A pump in a transmission of a vehicle, comprising:
    a top portion configured to mount onto a housing of the transmission;
    an outlet;
    an inlet in fluid communication with the outlet and a sump that includes a fluid; and
    a hose that includes a first end and a second end, wherein the first end is connected to the outlet and the second end includes a sprayer configured to emit the fluid onto a spray area of an outside surface of a cover of a torque converter, wherein the spray area is opposite a contact area of a clutch of the torque converter.

2. The pump of claim 1, wherein the sprayer is arranged to be located between a motor and the cover of a torque converter of the transmission.

3. The pump of claim 1, wherein the second end is closer in distance to an engine than the first end.

4. The pump of claim 1, wherein the first end is closer in distance to an engine than the second end.

5. The pump of claim 1, wherein the sprayer is configured to emit the fluid in response to a threshold pressure in the transmission.

6. An apparatus for a torque converter, comprising:
    a hose mounted on a housing of a transmission, wherein the hose includes a first end and a second end, wherein the second end includes a sprayer configured to spray fluid received from a supply in fluid communication with the first end of the hose, wherein the sprayer is further configured to spray onto an area of an outer surface of a cover of the torque converter.

7. The apparatus of claim 6, wherein the sprayer is further configured to spray onto the cover in response to a pressure of the torque converter exceeding a threshold.

8. The apparatus of claim 6, wherein the sprayer is further configured to spray onto the cover in response to a temperature of the torque converter exceeding a temperature-threshold.

9. The apparatus of claim 6, wherein the sprayer is arranged on a housing of the transmission between an electrical motor and the torque converter.

10. The apparatus of claim 6, wherein the supply is located between an engine and the torque converter.

11. The apparatus of claim 6, wherein the supply is located between the torque converter and the transmission.

12. The apparatus of claim 6, wherein the apparatus further includes a valve in communication with the sprayer, wherein the valve is configured to seal below a pressure threshold.

13. The apparatus of claim 6, wherein the apparatus further includes a valve in communication with the sprayer, wherein the valve is configured to open above a pressure threshold.

14. The apparatus of claim 6, wherein the torque converter is an integrated torque converter and a turbine of the torque converter forms a lock-up clutch piston.

15. The apparatus of claim 6, wherein the supply is a sump of the transmission.

16. The apparatus of claim 6, wherein the supply is a pump mounted on the transmission.

17. The apparatus of claim 6, wherein the area is opposite a contact area of a torque converter clutch.

18. A transmission module, comprising:
    a motor;
    a cover of a torque converter, wherein the cover includes an outside surface and an inside surface that includes a contact area of a torque converter clutch;
    the torque converter clutch configured to contact a portion of the inside surface of the cover; and
    a sprayer including a first end and a second end and configured to retrieve fluid via the first end and to emit fluid on the outside surface of the cover via the second end, wherein the sprayer is further configured to emit fluid onto the outside surface at an area opposite the contact area.

19. The transmission module of claim 18, wherein the sprayer is further configured to retrieve fluid via the first end in fluid communication with a sump of a pump.

20. The transmission module of claim 18, wherein the sprayer is further configured to retrieve fluid via the first end in fluid communication with a sump of the transmission.

* * * * *